(12) United States Patent
Lodrige

(10) Patent No.: US 6,961,874 B2
(45) Date of Patent: Nov. 1, 2005

(54) SOFTWARE HARDENING UTILIZING RECOVERABLE, CORRECTABLE, AND UNRECOVERABLE FAULT PROTOCOLS

(75) Inventor: Paul Lodrige, Palo Alto, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 529 days.

(21) Appl. No.: 10/151,349

(22) Filed: May 20, 2002

(65) Prior Publication Data

US 2003/0217309 A1    Nov. 20, 2003

(51) Int. Cl.[7] .............................................. G06F 11/00
(52) U.S. Cl. ...................................... 714/38; 717/124
(58) Field of Search .................... 714/38, 39; 717/124, 717/129, 127, 131

(56) References Cited

U.S. PATENT DOCUMENTS 5,948,112 A  *  9/1999  Shimada et al. .............. 714/16
6,182,243 B1 *  1/2001  Berthe et al. .................. 714/38
6,230,284 B1 *  5/2001  Lillevold ....................... 714/13
6,401,218 B1 *  6/2002  Linam et al. .................. 714/25
6,453,411 B1 *  9/2002  Hsu et al. ..................... 712/237
6,593,940 B1 *  7/2003  Petersen et al. ............. 715/700
6,691,250 B1 *  2/2004  Chandiramani et al. ...... 714/25
6,795,963 B1 *  9/2004  Andersen et al. ........... 717/130

* cited by examiner

Primary Examiner—Scott Baderman
Assistant Examiner—Paul Contino
(74) Attorney, Agent, or Firm—Kent A. Lembke; William J. Kubida; Hogan & Hartson LLP

(57) ABSTRACT

The invention provides a methodology for rendering software applications more highly available through active fault recovery thus encouraging fewer fatal faults. The invention allows recovery from both active and passive faults. The methodology in accordance with the invention also includes the steps collecting information regarding potential faults in the software code, identifying a plurality of correctable faults, selecting a likely correctable fault and making a correction to the software code.

15 Claims, 5 Drawing Sheets

SOFTWARE HARDENING UTILIZING RECOVERABLE, CORRECTABLE, AND UNRECOVERABLE FAULT PROTOCOLS

BACKGROUND OF THE INVENTION

1. Field of the Invention

The invention relates to software reliability. More particularly, the invention relates to an iterative methodology for detecting and correcting errors in computer software.

2. Discussion of the Related Art

In recent years, the size and complexity of software applications have increased significantly. Part of this increased size may be attributed to significant improvements in hardware, including increased in microprocessor speed and a reduction in the cost of volatile and non-volatile computer memory devices. Software developers have not focused on writing highly optimized, efficient code because inefficiencies in the software are often masked by the speed of the hardware.

Many different types of errors have been identified in software applications at the operating system level. For example, persistent storage problems compromise the integrity of the persistent store or impede it from performing its intended service. Persistent storage problems include faults that occur when a file system becomes full and thus unable to store data, leading to the blocking of file system clients awaiting storage resources, corruption of file system data structures, and corruption of files.

Memory problems are also common errors that compromise the integrity of transient memory. Driver/Driver isolation errors occur when a fault device is not effectively isolated by its device driver. The ineffective containment of the fault leads to fault propagation and usually the need for more drastic recovery action.

Incompatibility problems between older and newer versions of software are also common. This can lead to an inability to complete a task and can be particularly problematic as upgrades put the system in a state of inherent vulnerability. One example of this is a problem that may arise when an existing version of RAM code cannot properly load a new ROM code.

Inversion problems arise when a system cannot provide, in a timely manner, its intended function. For example, a priority inversion may occur when a high priority service is blocked while awaiting completion of a low priority service. A resource inversion may occur wherein a high priority service is blocked awaiting a resource held by a lower priority service.

Deadlock problems arise when a service awaits a condition that will never occur. Deadlocks may occur when a currently executing service awaits release of a resource held by another lower priority service not in execution. Deadlocks may also occur when a failure occurs or when a resource is depleted.

In view of the problems described above, the need for improved reliability in software applications has become more important, particularly for so called "mission critical" applications. Various techniques have been developed to improve software reliability. Some software developers have designed more efficient software by optimizing or "tuning" their code for a particular operational environment or mode by placing highly used routines closer together and optimizing the execution speed along heavily-traveled paths. The primary objective of such optimization is to reduce the time it takes a computer program to perform a particular task.

Hand tuning of software applications requires manual code correction by a programmer. As software applications have grown in size complexity, hand tuning has become increasingly tedious and time-consuming. Thus, hand tuning is often reserved for the most highly utilized program sections.

Automated tools such as optimizing compilers have been utilized to enhance the run-time performance of a piece of software. Automated profilers are employed to provide data to the optimizing compilers. In general, these profilers monitor the execution of a particular piece of software and gather information on the most likely paths of execution. The optimizing compiler then used the information gathered by the profiler to recompile the source code in a more efficient manner.

The automated optimization processes are generally limited to a usage pattern of a single fixed user group or single operational mode. Thus, these processes are limited, causing a degradation to the run-time performance of a program while executing in non-optimized operational environments or modes.

SUMMARY OF THE INVENTION

As described above, conventional software optimization methodologies operate on a very small scale and either require tedious hand tuning or are limited to single operational modes or environments. Therefore, there is a need for a superior software optimization technique that can function with complex software application.

The invention provides a methodology for software hardening that eliminates errors in software applications at the operating system level. Software hardening involves analyzing a software component's implementation or design and implementing changes to render the component more available, more correct, safely maintainable and able to collect and preserve useful post mortem information in case of a failure event. The invention also provides an iterative process for identifying and correcting software errors using pre-established rules.

In order to carry out the objectives of the invention, the invention provides a method for hardening software code that includes collecting information regarding potential faults in the software code, identifying a plurality of correctable faults, selecting a likely correctable fault and making a correction to the software.

The invention further provides a high availability software application having a reduces set of panic calls, wherein the software application is rendered highly available by conducting a design review of the software application, conducting a code review of the software application and conducting at least one run-time integrity check on the software application.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
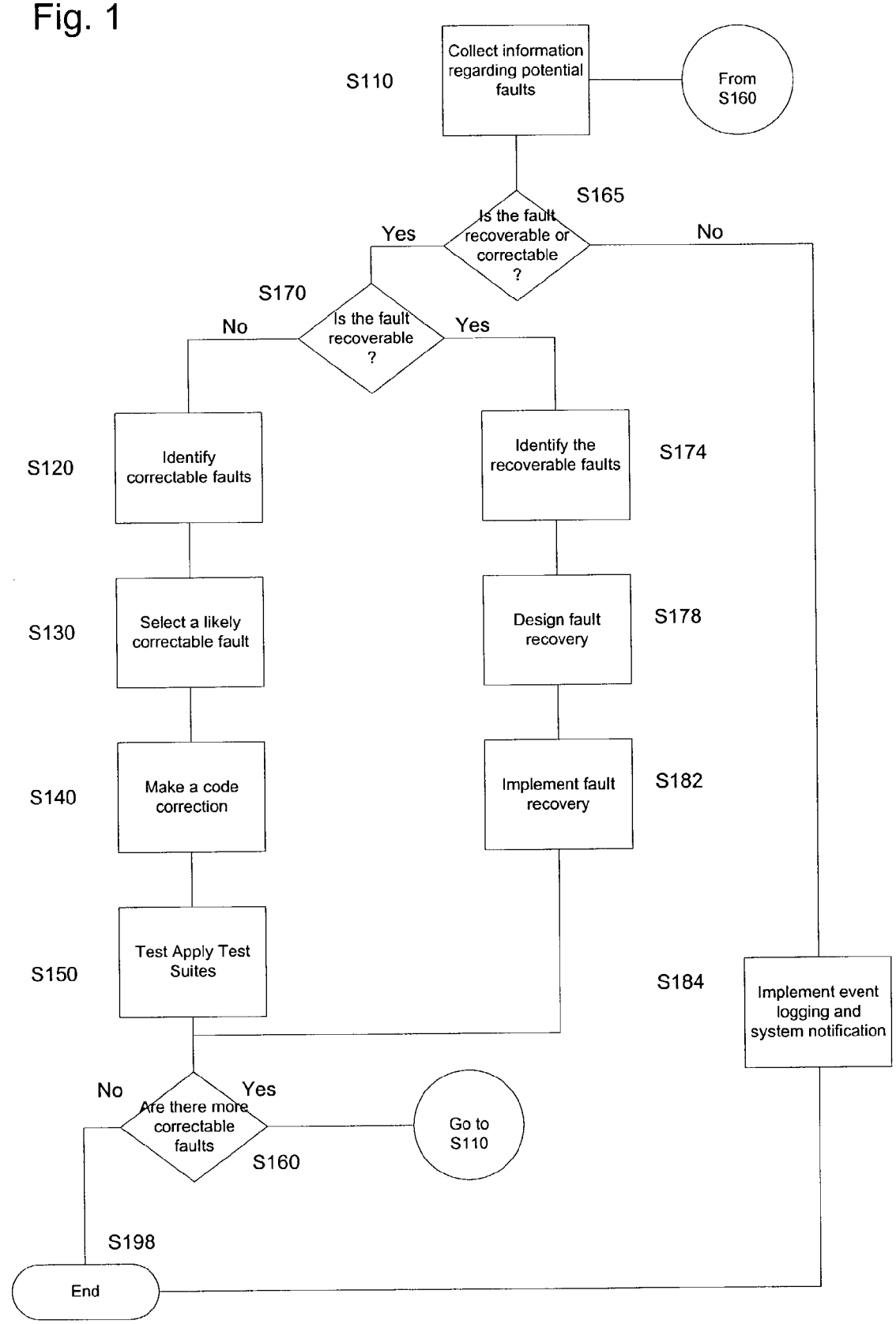
FIG. 1 is a flowchart of the process for hardening software in accordance with an embodiment of the invention.

Reference will now be made in detail to the preferred embodiments of the invention, examples of which are illustrated in the drawings.

FIG. 1 illustrates a methodology for hardening software in accordance with an embodiment of the invention. The resulting software application will have fewer faults. By way of example, a reduced set of panic calls in an operating system may be achieved, whereby the remaining panic calls are considered more easily recoverable and containable. Panic calls generally halt execution of the software application and require resolution before the application can be re-executed. In general, panics calls can be classified as either redundant panics, recoverable panics or correctable panics. Redundant panics are panic calls that will never be executed. Thus, they are typically removed from the code. Recoverable panics are panic calls for which remedial action may be taken in order to avoid the panic call. It should also be noted that a certain group of panics are not recoverable.

In FIG. 1, the process begins with step S110 whereby information regarding potential faults is collected. In general, the process for collecting information regarding potential faults includes carrying out various studies and analyses of the software code. These processes are described in greater detail below. As an example, one known fault type invokes panic calls at the operating system level. Panic calls represent a system notification of errors and may result in a software application suspending execution until the cause of the panic call is corrected. Following step S110, the process moves to step S165.

In step S165, the system determines whether the fault is recoverable or correctable. If the fault is neither recoverable or correctable, the fault is deemed unrecoverable and the process moves to step S184. Otherwise the process moves to step S170.

In step S184, the system implements event logging and system notification in order to log the event and provide some notification of the occurrence of an unrecoverable fault. The process then moves to step S198 and ends.

Returning to step S170, the system determines whether the fault is recoverable. If the fault is not recoverable, the process moves to step S120. If the fault is recoverable, the process moves to step S174. In step S174, the system identifies recoverable faults and the process moves to step S178. In step S178, the response to the identified faults, the fault recovery protocols are developed. The process then moves to step S182. In step S182, the system implements the fault recovery protocols designed to maintain the system and prevent further disruptions. The process then moves to step S160.

Returning to step S120, the correctable faults are identified. This requires analysis of each of the potential faults identified in step S110. The correctable faults may include both previously encountered faults along with faults that have been encountered. A set rules for correcting previously encountered faults may exist in order to correct the detected faults. For newly encountered faults, new rules can be developed as needed to correct those faults. It should be understood that the invention in its broader embodiments includes other types of faults in addition to panic calls at the operating system level.

Following the identification of correctable faults, the process then moves to step S130. In step S130, the likely correctable faults are selected. The likely correctable faults refer to faults that merit correction. For example, faults along hot code paths will typically merit correction over cold code, or less frequently executed, paths. The process then moves to step S140.

In step S140, a code correction is made. The code correction may be carried out by a variety of techniques, including executing previously generated correction algorithms intended to correct code errors, modifying existing code or changing the design rules. Modifying existing code may involve a manual correction of a code segment to correct the detected error. Changing the design rules may involve changing the basic guidelines invoked by code developers when writing code. The process then moves to step S150. In step S150, the system applies test suites to the software application. Test suites include predetermined rules for correcting previously encountered application errors. Thus, in step S150, the system determines whether a test suite exists for an identifies application error. If a test suite exists, it is retrieved and applied. Generally, test suite data is capable of injecting data faults to trigger fault detection to verify that the code is now recoverable. The process then moves to step S160.

In step S160, the system determines whether there are any more correctable faults. If there are any more correctable faults, the process returns to step S110 and begins again. Otherwise, the process moves to step S198 and ends.

Figure 2:
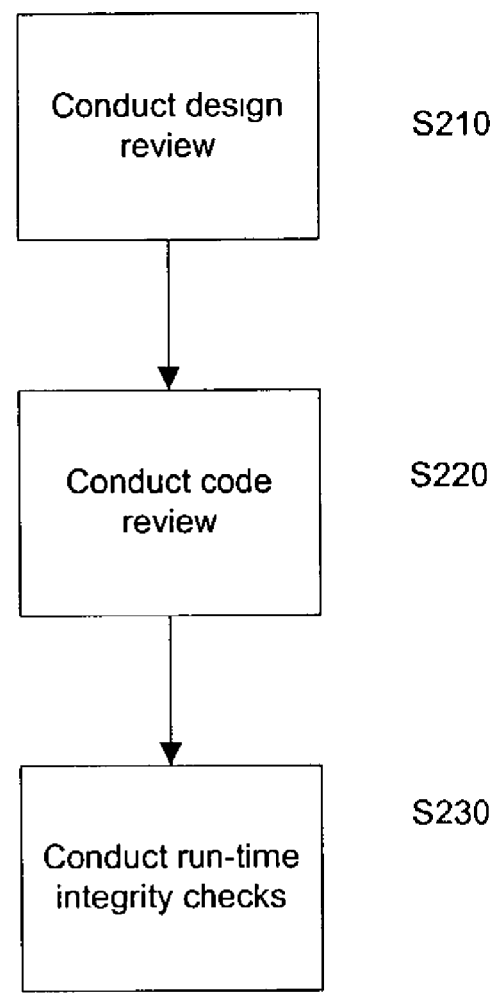
FIG. 2 is a flowchart illustrating a process collecting information regarding potential faults in software in accordance with an embodiment of the invention.

FIG. 2 illustrates the process of step S140 of FIG. 1 for making code corrections in accordance with an embodiment of the invention in greater detail.

As shown in FIG. 2, the process begins with step S210 where a design review is conducted. The design review requires a review and study of the design concepts underlying the software application, including the underlying design logic. During the design review step S210, architectural weaknesses in the software application may also be identified. In many cases the common architectural weaknesses have been previously detected and documented. The process then moves to step S220 where a code review is conducted.

The code review step S220 includes the identification by code inspection and automated tools of potential weaknesses in the software application that can lead to a code failure. In general, kernel networking stacks include a complex set of modules and drivers that include hot code paths and cold code paths. Hot code paths are those which are continuously exercised, while cold paths are only exercised occasionally. In many cases, conducting a full code review is very time consuming, and thus impractical. Thus, the code review step requires utilizing the best approach for studying the software code. There are several techniques that may be used to most efficiently analyze the code. For example, code coverage tools may be utilized in order to identify hot code paths and cooler code paths involved in error handling and recovery. The code review and inspection process is described in greater detail below in conjunction with FIG. 3. After completion of the code review step S220, the process moves to step S230.

In step S230, run-time integrity checks are conducted. Run-time integrity checks actually may involve two operations. First, the system determines how to detect a run time error. Second, is an error is detected, the system determines how to recover from the error. There are several ways of detecting run time errors. For example, validity checks may be inserted into the entry points of even within certain modules. Conducting run-time integrity checks may entail the following: carrying out a general review of return on investment from run-time integrity checking, a bug analysis that examines past network failures in the bugs database, investigation of "ad-hoc", module specific approach to run-time checking, investigation of generic streams infrastructure-based approach to run-time checking, investigation of recovery strategies and investigation of appropriate ways of applying checking without impacting performance/code quality. Once the run time integrity checks are conducted, the process then ends. It is important to note that the invention provides for run-time and non-time error determinations (both active and passive recoveries).

Figure 3:
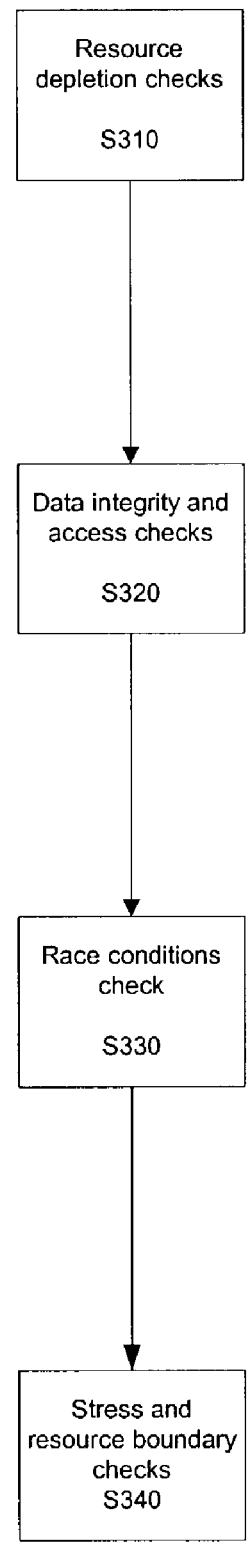
FIG. 3 is a flowchart further illustrating the process of FIG. 2 in greater detail.

FIG. 3 illustrates the code review, code correction and implementation validity check process in greater detail. As shown in FIG. 3, the process begins with step S310 whereby resource depletion checks are conducted. Resource depletion checks involve determining whether certain system components have capacity. For example, the system may determine whether there is un-freed memory. The process then moves to step S320.

In step S320, the system conducts data integrity checks. Data integrity checks may involve software checksums of cyclic redundancy checks on data payloads. The process than moves to step S330.

In step S330, the system conducts race conditions checks. Race conditions checks may involve verifying that correct data access locking mechanisms are in place. For example, the system will determine whether a module holds queue locks inappropriately. The process than moves to step S340.

In step S340, the system conducts stress and resource boundary checks. Stress and boundary checks may involve such things as verifying out of memory recovery and limits checking. For example, the system will determine whether there is recovery code in the case of a resource allocation failure. The process then ends. Code inspection may also include a variety of other software checks, including switch statement to be fully enumerated; fully enforced brackets; no conditional assignments; ASSERT validation and verification checks; Endian correctness checks; variable overrun checks; and global variable misuse.

Figure 4:
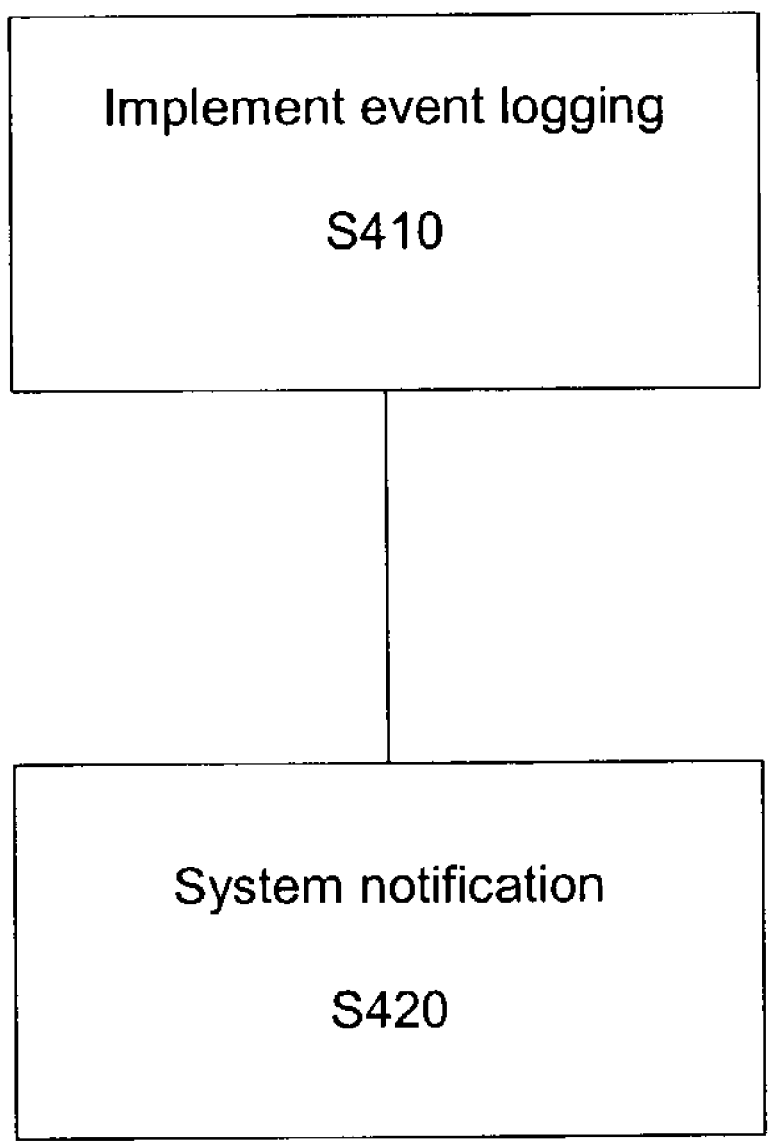
FIG. 4 is a flowchart further illustrating the process of FIG. 3 in greater detail.

FIG. 4 illustrates the process that follows the code inspection process as described in connection with FIG. 2 and that is part of the code review process step S220. In FIG. 4, the process begins with step S410. In step S410, the event logging is implemented based upon the results of the code inspection. Event logging entails logging the occurrences of certain predetermined events as they occur during execution of a software application. The event to be logged are generally determined based upon the results of the code inspection step shown in FIG. 2 and described above. During the code inspection step, the system determines various application errors, potential errors or other irregularities. Based upon these findings, various events can be traced and logged. The data collected as a result of the event logging process may be studied following execution of the software application in order to understand the nature and frequency of the occurrence of the fault that is logged. Event logging may include a number of actions including: investigation of in-kernel logging mechanisms, investigation of run-time health checking, compiling a list of candidates for logging, i.e., TCP connection state changes, packet headers sequence numbers, lock histories and soft error, investigation of possible enhancements to existing post-mortem analysis tools and consideration of an application to break out in-kernel logs, set logging levels, and generate user alerts. The process then moves to step S420.

In step S420, a system notification is issued based upon the results of the event logging step S410. The notification informs the system that certain events have taken place and that corrective action may be required. The process then ends.

Figure 5:
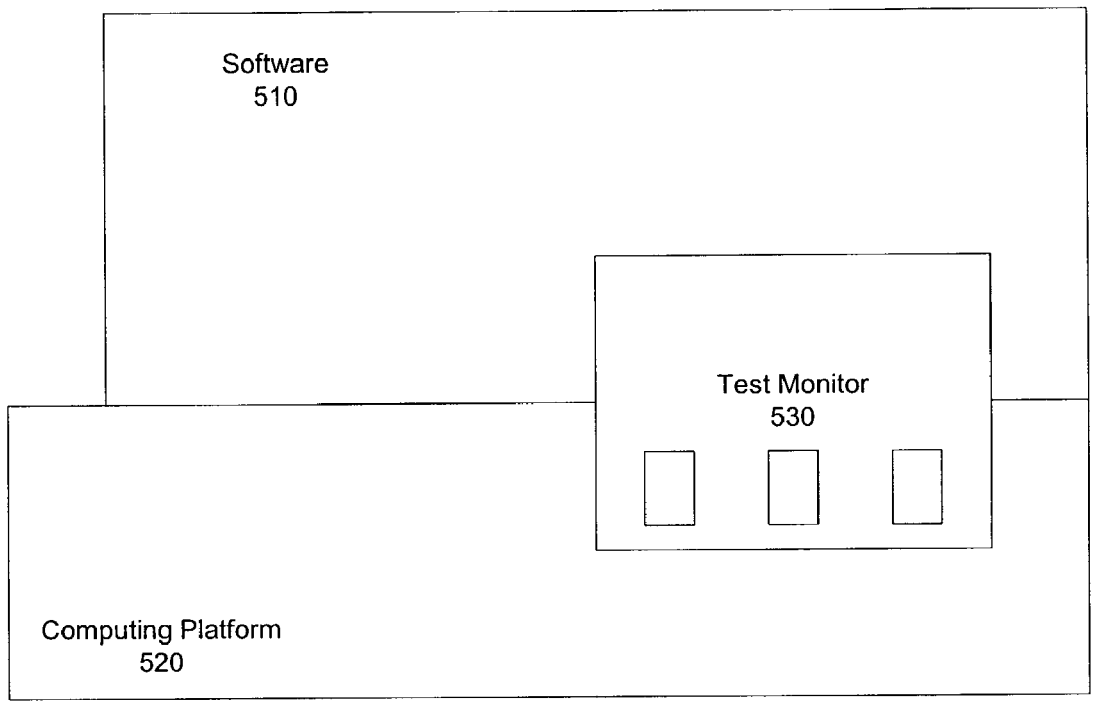
FIG. 5 is a diagram illustrating a test monitor for detecting faults during the execution of software applications is accordance with an embodiment of the invention.

FIG. 5 conceptually illustrates a test monitor in accordance with an embodiment of the invention for detecting and collecting information regarding faults. FIG. 5 illustrates a software application 510 running on a computing platform 520. The computing platform 520 includes an operating system. A test monitor 530 is disposed between the computing platform 520 and the software 510. The test monitor 530 monitors execution of the software application. In accordance with one embodiment of the invention, the test monitor 530 may be configured to collect information relating to faults in the software application during execution. For example, the test monitor may be configured for event logging and thereby log the occurrence of certain events, including certain types of faults. The faults observed by the test monitor may be studied following execution of the software in order to analyze the nature of the faults and generate rules for correcting the faults. Thus, logging faults as they are observed during execution of the software allows operators of software to study the nature and potential causes of faults after they the execution of the software application.

While specific embodiments of the invention have been described herein, it will be apparent to those skilled in the art that various modifications may be made without departing from the spirit and scope of the invention.

What is claimed is:

1. A method for reducing faults in a software application comprising the steps of:

collecting information regarding at least one potential fault in a software code listing;

determining whether the at least one fault is one of a recoverable fault, a correctable fault and an unrecoverable fault; and implementing one of a recoverable fault protocol, a correctable fault protocol and an unrecoverable fault protocol based upon the determining step, wherein the correctable fault protocol comprises making a code correction related to the correctable fault, the code correction comprising at least one of executing a correction algorithm previously generated to correct code errors or modifying existing code associated with the at least one fault, wherein the correctable fault protocol includes the steps of:

identifying at least one correctable fault;

selecting at least one likely correctable fault based upon the at least one identified correctable fault, wherein the at least one likely correctable fault is determined to be on a hot code path;

implementing the code correction for correcting the at least one likely correctable fault; and applying test suites to the software application, wherein the test suites comprise predetermined rules for correcting previously encountered application errors.

2. The method according to claim 1, wherein the unrecoverable fault protocol includes the steps of:

implementing event logging in order to document the at least one fault; and providing a system notification of the occurrence of the at least one fault.

3. The method according to claim 1, wherein the recoverable fault protocol includes the steps of:
identifying at least one recoverable fault;
developing a fault recovery regime based upon the identified at least one recoverable fault; and
implementing the fault recovery regime.

4. The method according to claim 1, wherein the correctable fault includes at least one of a previously encountered fault and a previously undetected fault.

5. The method according to claim 1, wherein the at least one likely correctable fault includes a fault along a frequently executed code path.

6. The method according to claim 1, wherein the step of implementing a code correction includes at least one of executing previously generated correction algorithms intended to correct code errors, modifying existing code and changing the design rules.

7. The method according to claim 1, wherein the step of implementing a code correction further includes the steps of:
conducting a design review;
conducting a code review; and
implementing run-time integrity checks.

8. The method according to claim 7, wherein the step of implementing run time integrity checks includes at least one of conducting a general review of a return on investment from the run-time integrity checks; implementing a bug analysis that examines past network failures in a bugs database; investigating a generic streams infrastructure-based approach to run-time checking; and investigating recovery strategies.

9. The method according to claim 7, wherein the step of conducting a code review further includes:
conducting a resource depletion check;
conducting a data integrity and access check;
implementing race conditions checks; and
implementing stress and resource boundary checks.

10. The method according to claim 7, further including the steps of implementing event logging in order to document the at least one fault; and providing a system notification of the occurrence of the at least one fault.

11. A method for reducing faults in a software application, comprising:
collecting information regarding a fault in the software application;
determining whether the fault is a correctable fault;
when the fault is determined to be a correctable fault, operating a code coverage tool to identify a set of hot code paths for the software application and to determine whether the correctable fault is in one or more of the hot code paths; and
when the fault is determined to be a correctable fault and in a hot code path, making a code correction related to the correctable fault;
wherein the code correction comprises at least one of executing a correction algorithm previously generated to correct code errors associated with the fault or modifying existing code associated with the fault.

12. The method of claim 11, wherein the code correction comprises at least one of conducting a resource depletion check, conducting a data integrity and access check, implementing race conditions checks, and implementing stress and resource boundary checks.

13. A computer system configured for reducing faults in a software application comprising the steps of:
means for collecting information regarding at least one potential fault in a software code listing;
means for determining whether the at least one fault is one of a recoverable fault, a correctable fault and an unrecoverable fault; and
means for implementing one of a recoverable fault protocol, a correctable fault protocol and an unrecoverable fault protocol based upon the determining step, wherein the correctable fault protocol comprises making a code correction related to the correctable fault, the code correction comprising at least one of executing a correction algorithm previously generated to correct code errors or modifying existing code associated with the at least one fault,
wherein the correctable fault protocol includes the steps of:
identifying at least one correctable fault;
selecting at least one likely correctable fault based upon the at least one identified correctable fault, wherein the at least one likely correctable fault is determined to be on a hot code path;
implementing the code correction for correcting the at least one likely correctable fault; and
applying test suites to the software application, wherein the test suites comprise predetermined rules for correcting previously encountered application errors.

14. The computer system according to claim 1, wherein the unrecoverable fault protocol includes the steps of:
implementing event logging in order to document the at least one fault; and
providing a system notification of the occurrence of the at least one fault.

15. The computer system according to claim 1, wherein the recoverable fault protocol includes the steps of:
identifying at least one recoverable fault;
developing a fault recovery regime based upon the identified at least one recoverable fault; and
implementing the fault recovery regime.

* * * * *

UNITED STATES PATENT AND TRADEMARK OFFICE
CERTIFICATE OF CORRECTION

PATENT NO. : 6,961,874 B2
DATED : November 1, 2005
INVENTOR(S) : Paul Lodrige

It is certified that error appears in the above-identified patent and that said Letters Patent is hereby corrected as shown below:

Column 7,
Line 27, after "of" insert -- ; --.

Column 8,
Lines 38 and 44, "1" should be -- 13 --.

Signed and Sealed this

Third Day of January, 2006

JON W. DUDAS
*Director of the United States Patent and Trademark Office*